United States Patent [19]

Koop et al.

[11] Patent Number: 4,823,349
[45] Date of Patent: Apr. 18, 1989

[54] RESONATOR MODULE AND BLOWER MODULE ASSEMBLY

[75] Inventors: Dale E. Koop, Sunnyvale; Joseph F. Rando, Los Altos Hills, both of Calif.

[73] Assignee: Rofin-Sinar, Inc., San Jose, Calif.

[21] Appl. No.: 33,093

[22] Filed: Mar. 31, 1987

[51] Int. Cl.[4] ............................................... H01S 3/04
[52] U.S. Cl. ....................................... 372/34; 372/65; 372/78; 372/93; 372/97; 372/99; 165/47
[58] Field of Search ...................... 372/34, 61, 55, 65, 372/97, 99, 107, 59, 78, 35, 93, 103; 165/47, 80.3, 145

[56] References Cited

U.S. PATENT DOCUMENTS

| | | | |
|---|---|---|---|
| 3,900,804 | 8/1975 | Davis et al. | 372/34 |
| 4,507,789 | 3/1985 | Daly et al. | 372/92 |
| 4,592,063 | 5/1986 | Accetta et al. | 372/55 |
| 4,709,372 | 11/1987 | Rando et al. | 372/93 |

FOREIGN PATENT DOCUMENTS

| | | | |
|---|---|---|---|
| 6057986 | 9/1983 | Japan | 372/34 |
| 0107879 | 6/1985 | Japan | 372/34 |

Primary Examiner—William L. Sikes
Assistant Examiner—Xuan Thi Vo
Attorney, Agent, or Firm—Donald C. Feix; Thomas M. Freiburger

[57] ABSTRACT

A flowing gas laser, of the kind in which gas flows continuously through the lasing region and is circulated through the heat exchanger for cooling before being returned to the lasing region, comprises a resonator module and a blower module. The optical components of the laser are mounted on an outer surface of the resonator module, and the resonator module has an interior structure for conducting the circulating gas to the lasing region. The blower module has heat exchange structure for cooling the circulating gas and has a blower for pumping the circulating gas. The blower module is physically separated from the resonator module to prevent the heat and vibration of the blower module from distorting or otherwise affecting the structure or the performance of the optical components. Ducting the interconnects the resonator module and the blower module for circulating the gas between these modules. Precision bore and pin structures are used for mounting all of the support structure for the laser at predetermined, fixed positions on the resonator module without the need for subsequent adjustment of such support structure.

4 Claims, 4 Drawing Sheets

RESONATOR MODULE AND BLOWER MODULE ASSEMBLY

BACKGROUND OF THE INVENTION

This invention relates to a flowing gas laser of the kind in which the gas flows continuously through the lasing region and is circulated through a heat exchanger for cooling before returning to the lasing region.

This invention relates particularly to a flowing gas laser which has a resonator module mounting and supporting all of the optical components of the laser and which has a separate blower module for cooling the circulating gas and for pumping the cooled circulating gas back to the resonator module.

It is necessary to cool the gas in a flowing gas laser in order to obtain desired levels of power amplification and desired efficiency of operation. The amplification and efficiency decreases with increasing temperature of the laser gas.

A pump or blower is required to circulate the flowing gas between heat exchanger structure and the components of the laser associated with the active regions of lasing action.

The heat and the vibration which are incident to the heat exchange and pumping can distort or otherwise adversely affect the structure or performance of the optical components of the laser.

Assembling the active components of the laser and obtaining accurate positioning of those components with respect to one another can also present problems, particularly when the laser incorporates a folded optical path for making the overall structure more compact.

SUMMARY OF THE PRESENT INVENTION

It is a primary object of the present invention to separate the heat exchange and pumping functions from the active, lasing functions of a flowing gas laser so that the heat and vibration associated with the heat exchange and pumping of the circulating gas do not affect the performance of the active parts of the laser.

This object is achieved by a laser construction which has separate resonator and blower modules.

The optical components of the laser are mounted on the resonator module and the resonator module has an interior structure for conducting the circulating gas to the laser region.

The blower module has heat exchanger structure for cooling the circulating gas and has a blower for pumping the circulating gas. The blower module is physically separated from the resonator module by a sufficient distance so as to prevent the heat and vibration of the blower module from affecting the performance of the components mounted on the resonator module.

Ducting conducts the circulating gas between the resonator module and the blower module.

The ducting, the resonator module construction and the blower module construction provide a compact laser unit which occupies little space and which operates efficiently.

Another important object of the present invention is to mount all of the active laser components (including laser tube supports, electrodes, gas manifolds, and end mirror support structure) directly to an outer surface of the resonator module at predetermined fixed locations and without the need for any adjustment of any active laser component, other than possible subsequent adjustment of end mirrors within the end mirror support structure.

This objective is achieved by using precision bore and associated pin structure for mounting laser component support blocks at predetermined, fixed positions and for keying the support blocks into such fixed positions as the support blocks are assembled and mounted onto the resonator module.

Another object of the present invention to construct the blower module so that the pump and associated drive motor can be readily withdrawn from and inserted into the blower module for repair or maintenance. This object is achieved by mounting the pump and associated drive motor on one removable end wall of a housing. The pump has an outlet conduit with a plug-in connector at the end of the conduit. The plug-in connector plugs into and out of a related opening in a heat exchanger within the housing so that the pump can be readily plugged into the heat exchanger as the pump is inserted into the housing and can be easily disconnected from the heat exchanger as the pump is removed from the housing.

Flowing gas laser apparatus and methods which embody the structural features described above and which are effective to function as described above constitute further, specific objects of the present invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DETAILED DESCRIPTION OF THE PREFERRED EMBODIMENTS

Figure 1:
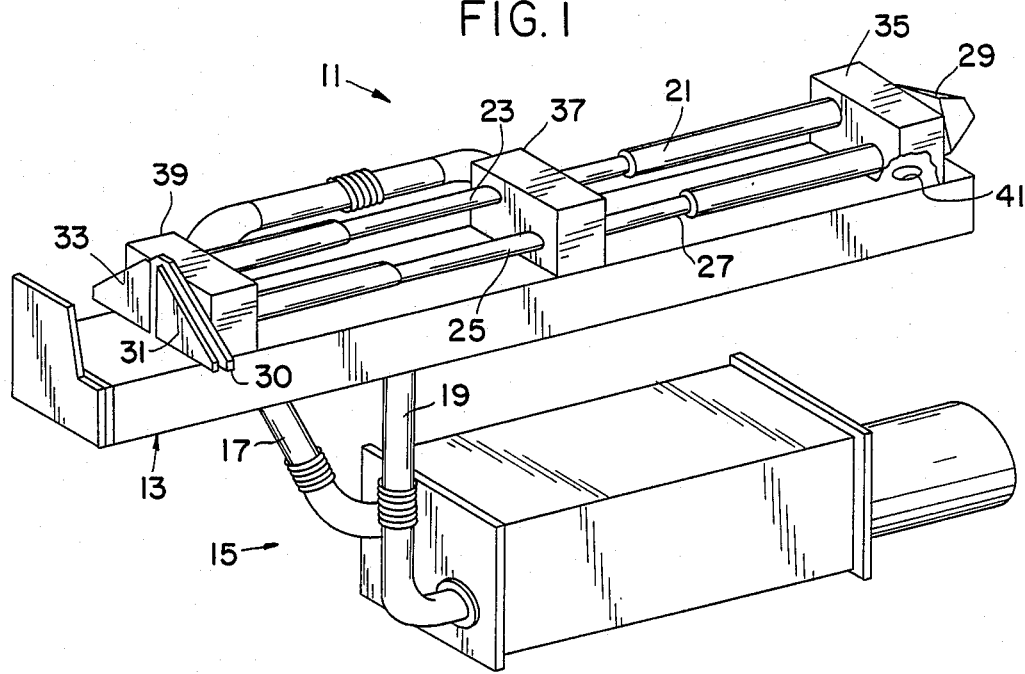
FIG. 1 is an isometric view of a fast axial flow laser having separate resonator and blower modules and constructed in accordance with one embodiment of the present invention

A flowing gas laser constructed in accordance with one embodiment of the present invention is indicated generally by the reference numeral 11 in FIG. 1.

The laser 11 includes a resonator module 13 and a blower module 15. The blower module 15 is physically separated from the resonator module 13 to prevent the heat and vibration produce during operation of the blower module from distorting or otherwise affecting the structure or performance of the optical components associated with the resonator module.

A hot gas duct 17 conducts hot gas from the resonator module to the blower module, and a cool gas duct 19 conducts cool gas from the blower module to the resonator module.

In the specific embodiment illustrated in FIG. 1 the laser 11 is a carbon dioxide gas laser having four laser tubes 21, 23, 25 and 27 connected for axial gas flow in a folded light path mode of operation. The folded light path is produced by a three mirror fold path cube corner 29 and by two end mirrors mounted in tilt plates 31 and 33.

The laser tube and related optical component construction of the carbon dioxide laser 11 shown in FIG. 1 is similar to the four tube carbon dioxide axial flow lasers illustrated and described in pending U.S. patent application Ser. No. 06/863,632 filed May 14, 1986 by Robert B. Slusher, et al. and entitled "Fast Axial Flow Carbon Dioxide Laser" and is also similar to the fast axial flow carbon dioxide laser illustrated and described in pending application Ser. No. 06/811,593 filed Dec. 19, 1985 by Joseph F. Rando, et al. and entitled "Fast Axial Flow Laser Circulating System". Both of these pending U.S. patent applications are assigned to the same Assignee as the Assignee of the present application, and both of these pending applications are incorporated by reference in this pending application in accordance with the provisions of Section 6O8.O1(p)(B) of the *Manual of Patent Examining Procedure* of the U.S. Patent and Trademark Office.

The laser shown in FIG. 1 includes a mounting block 35, a mounting block 37 and a mounting block 39.

The block 35 supports the gas inlet ends of the tubes 21 and 27, and the block 39 supports the gas inlet ends of the tube 23 and 25.

Each of the blocks 35 and 39 has interior passageways which serve to interconnect the related inlet ends of the laser tubes with ports 41 extending through the upper surface of the resonator module 13. One such port 41 is illustrated in the broken away portion of the block 35 in FIG. 1.

The block 35 and the block 39 serve as tube support blocks and as inlet manifolds for the respective gas inlet ends of the laser tubes associated with those blocks.

The block 37 is a support block for the gas outlet ends of the tubes 21, 23, 25 and 27. The block 37 has an internal passageway construction which conducts the exhaust gases into the hot gas return ducting 17. The block 37 thus serves both as a support block for the related ends of the gas laser tubes and as an exhaust manifold conducting the hot gases from for those tube ends to the hot gas duct 17.

The cool gas is conducted from the duct 19 to the ports 41 through an internal passageway in the resonator module 13. This internal passageway is indicated diagrammatically by the passageway 43 in FIG. 2.

Figure 2:
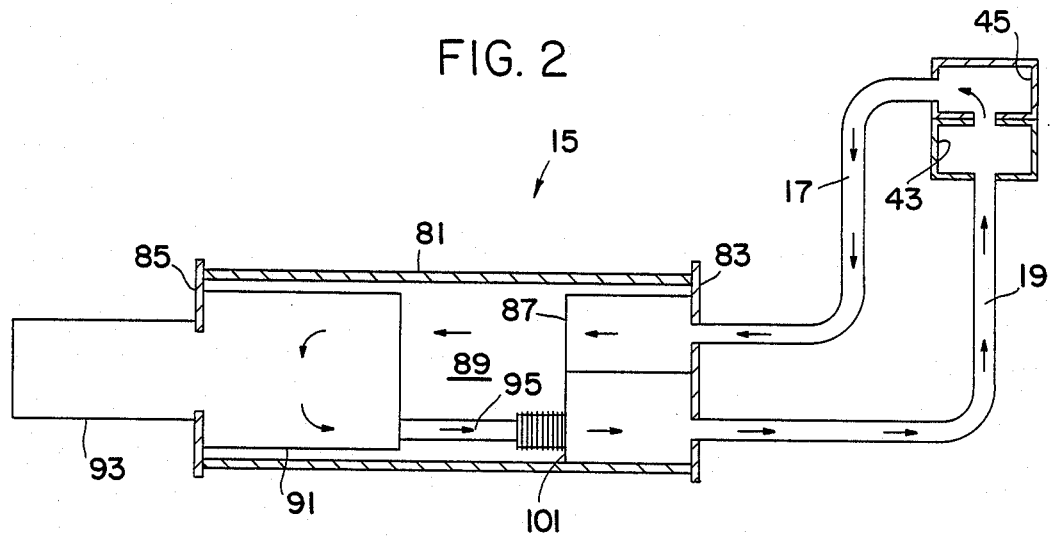
FIG. 2 is an elevation view in cross section showing the circulation of gas between the resonator module and the blower module of the fast axial flow laser shown in Figure 1.

The exhaust manifold provided within the block 37 is indicated diagrammatically by the passageway 45 in FIG. 2.

Figure 6:
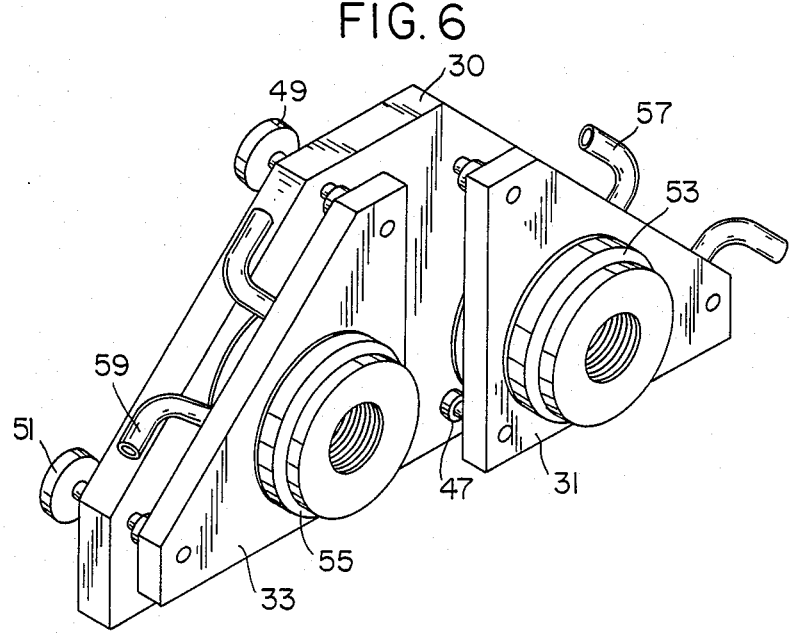
FIG. 6 is an enlarged, isometric detailed view showing the mounting of the end mirrors and associated base and tilt adjustment plates for the laser shown in FIGS. 1 and 4.

As best illustrated in the enlarged, isometric view of FIG. 6, the end mirror assembly includes, in addition to the mirror mounting plates 31 and 33, a base plate 30. The base plate 30 is mounted on the block 39, and each of the plates 31 and 33 are mounted on the plate 30 by a triangular tilt plate adjustment mechanism which comprises a pivot connection 47 and two tilt adjustment screws 49 and 51.

The reflecting end mirrors are mounted in the tilt plates 31 and 33 by mirror cells 53 and 55.

Cooling lines 57 and 59, as shown in FIG. 6, are associated with the mirror mounting cells 53 and 55 for circulating coolant to maintain a cool temperature on a chiller member associated with the mirror in the cell.

Figure 5:
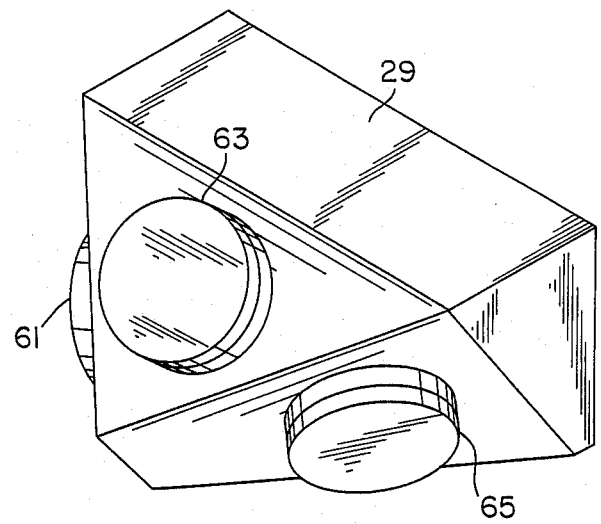
FIG. 5 is an enlarged, isometric detailed view of a cube corner, three-mirror reflector used with the embodiment of the laser shown in FIGS. 1 and 4.

As best illustrated in FIG. 5, the cube corner 29 comprises three mirrors 61, 63 and 65 mounted in fixed positions with respect to each other for forming a fold path for the laser light passing through the cube corner 29.

Figure 7:
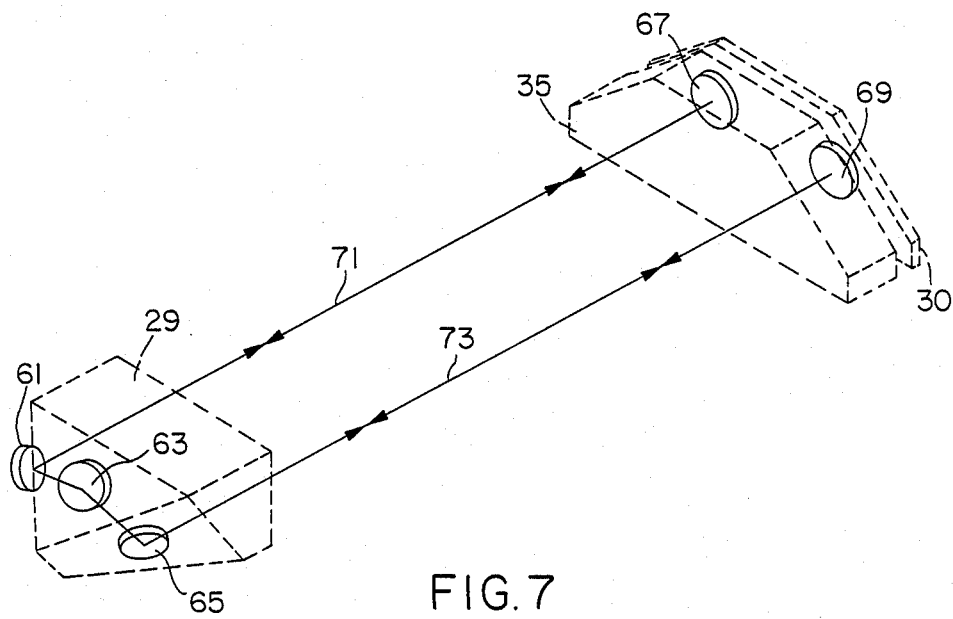
FIG. 7 is an isometric view showing the path of the light beam in the laser tubes for the laser shown in FIGS. 1 and 4.

This fold path for the light is illustrated in FIG. 7.

In FIG. 7 the two end mirrors are indicated by the reference numerals 67 and 69, and the light path of the laser beam in the tubes 25 and 27 is indicated by the reference numeral 71 while the light path of the laser beam within the tubes 21 and 23 is indicated by the reference numeral 73.

The function of the cube corner 29 in providing the fold in the light path is described in detail in the application Ser. No. 06/811,593 incorporated by reference.

In accordance with the present invention the blocks 35, 37 and 39 are each mounted in a predetermined, fixed position on the upper surface of the resonator module 13 by a precision bore and associated pin construction. This keys the mounting blocks onto the resonator module and eliminates the need for adjustment of the mounting blocks and active laser components associated with those mounting blocks, except for possible adjustment of the end mirrors 67 and 69 (see FIG. 7) in the tilt plates 31 and 33 (see FIG. 6).

The laser tube support and inlet manifold blocks 35 and 39 are thus positioned in precise positions with respect to the ports 41.

The laser tube support and exhaust manifold block 37 is precisely positioned with respect to the blocks 35 and 39.

As a result of the precision mounting of the blocks 35, 37 and 39 on the upper surface of the resonator modulator 13, the only subsequent adjustment that might be required of any of the active components of the laser is a possible adjustment of the end mirrors.

The precision bores are formed in the support blocks and/or in the resonator module. Dowel pins, like the pin 75 shown in the broken away part of the block 37 in FIG. 4, fit within the precision bores and key and lock the support blocks and related laser structure in place.

Figure 4:
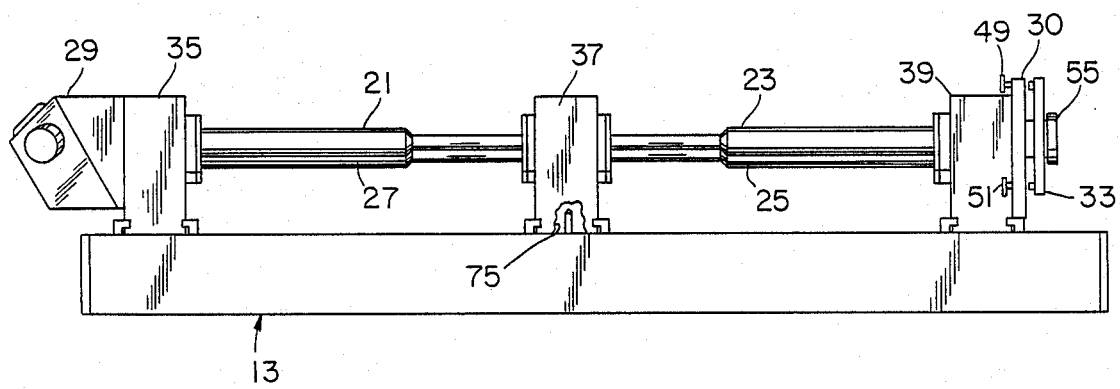
FIG. 4 is an elevation view showing the resonator module with the laser tubes and related manifolds and optics mounted on the top of the resonator module.

In one specific embodiment of the invention the cube corner 29 is also mounted on the support block 35 by a precision bore and related pin arrangement like that shown for the block 37 in FIG. 4.

Figure 3:
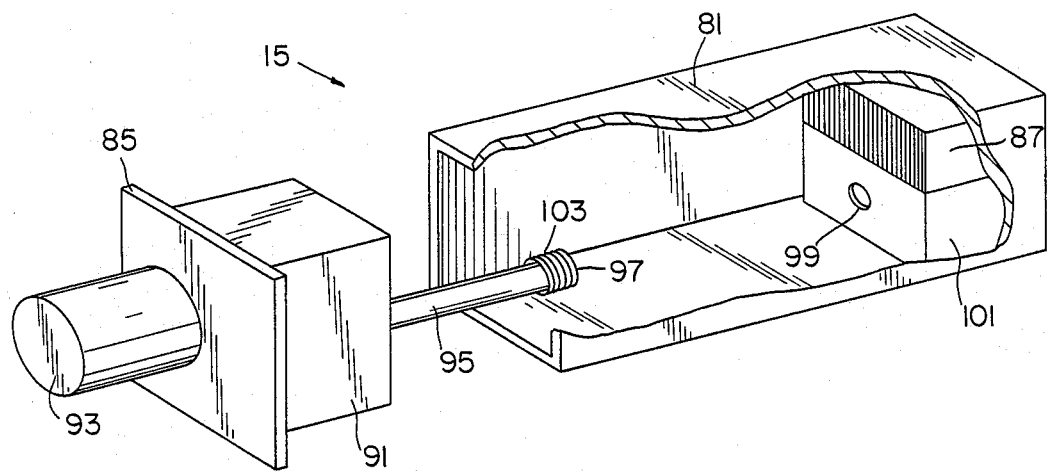
FIG. 3 is an enlarged, exploded view, partially broken away in cross section to show details of construction, of the blower module.

With specific reference now to FIGS. 1, 2 and 3, features of the blower module 15 will be described.

The blower module 15 includes a housing 81. The housing 81 has a fixed end wall 83 and a removable end wall 85.

As best illustrated in FIG. 2, a heat exchanger 87 is mounted within the housing 81 and is associated with the fixed end wall 83 so as to receive hot gas from the duct 17 at the inlet of the heat exchanger 87. This hot gas, after being cooled as it flows through the heat exchanger 87, passes into a chamber 89 which is formed within the housing 81 between the outlet of the heat exchanger 87 and the inlet of a pump 91.

The chamber 89 within the housing 81 serves as a gas accumulator and ballast space.

The pump 91 is associated with removable end 85 of the blower module and is driven by a motor 93 which is also associated with the removable end wall 85. See FIG. 3.

A conduit 95 has a plug in connector 97 which plugs into an opening 99 at the inlet of a second heat exchanger 101.

A bellows 103 is preferably associated with the outlet end of the conduit for assisting in providing a gas tight seal when the conduit 95 is plugged into the inlet 99.

The second heat exchanger 101 has an outlet connected to the cool gas duct 19 for returning the cooled gas to the resonator module 13.

The way in which the pump 91 and motor 93 are associated with the removable end wall 85, and the way that the plug-in connector 97 is associated with the inlet of the second heat exchanger 101 permits the pump and motor assembly to be readily removed from and then easily reinserted into the housing 81 for any required maintenance and repair.

While we have illustrated and described the preferred embodiments of the invention, it is to be understood that these are capable of variation and modification, and we therefore do not wish to be limited to the precise details set forth, but desire to avail ourselves of such changes and alterations as fall within the purview of the following claims.

We claim:

1. A flowing gas laser of the kind in which the gas used in the lasing region flows continuously through the lasing region and is circulated through a heat exchanger for cooling before being returned to the lasing region, said laser comprising, resonator module means having an outer surface for mounting the optical components of the laser and having interior structure for conducting the circulating gas to the lasing region, blower module means having heat exchanger structure for cooling the circulating gas and having a blower for pumping the circulating gas, said blower module means being physically separated from and spaced away from the resonator module means to prevent the heat and vibration of the blower module means from distorting or otherwise affecting the structure or the performance of the optical components, and wherein the blower module means includes a housing having a first fixed end wall, a second removable end wall, first and second heat exchangers associated with the fixed end wall, a motor and pump associated with the removable end wall, a chamber space between the first heat exchanger and the blower and which space serves as a gas accumulator and ballast space, a conduit extending from the blower outlet to the inlet of the second heat exchanger, and plug in connector means at the heat exchanger end of said conduit for permitting the blower to be readily attached to and disconnected from the second heat exchanger as the motor and pump are inserted into and removed from said housing for maintenance or repair, and ducting means for conducting the circulating gas between the resonator module means and the blower module means.

2. The invention defined in claim 1 wherein the first heat exchanger is constructed to receive hot gas from the resonator module means and to cool and to discharge the gas into the accumulator and ballast space, the pump takes gas from said space and pumps the gas through said conduit to the second heat exchanger, and the second heat exchanger further cools the gas as the gas flows to the resonator module.

3. A blower and heat exchange module for a flowing gas laser of the kind in which the gas used in the lasing region flows continually through the lasing region and is circulated through a heat exchanger for cooling before being returned to the lasing region, said blower module comprising, a housing constructed to be physically separated from and spaced away from the structure which mounts the optical components of the laser so that the heat and vibration of the blower module cannot distort or otherwise affect the structure or performance of the optical components, said housing having a first fixed end wall and a second removable end wall, a first heat exchanger mounted within the housing and associated with a port in the fixed end wall which receives hot gas from a conduit connected to an exhaust manifold of the laser, a second heat exchanger associated with the fixed end wall and connected to a port associated with a conduit which transfers cool gas from the blower module to the laser, a motor and pump associated with the removable end wall, a conduit extending from the outlet of the pump to the inlet of the second heat exchanger, plug-in connector means connecting the end of said conduit with the inlet to the second heat exchanger so that the blower and pump can be readily disconnected from and easily plugged into operative association with the second heat exchanger when the pump and blower are withdrawn from and inserted back into the housing for maintenance or repair, and wherein the housing has an interior space extending between the outlet of the first heat exchanger and the inlet to the blower with the interior space serving as a gas accumulator and gas ballast space.

4. The invention defined in claim 3 wherein the plug in connector includes a flexible bellows for accommodating tolerance variations and for assisting in providing a seal between the end of said conduit and the inlet to the second heat exchanger.

* * * * *